US012722617B2

(12) United States Patent
Knop et al.

(10) Patent No.: US 12,722,617 B2
(45) Date of Patent: Sep. 1, 2026

(54) BALL-SCREW DRIVE FOR AN ACTUATOR ASSEMBLY, AN ACTUATOR ASSEMBLY, AND A METHOD FOR PRODUCING A BALL-SCREW DRIVE

(71) Applicant: ZF Active Safety GmbH, Koblenz (DE)

(72) Inventors: Volker Knop, Ulmen (DE); Nicholas Alford, Waldesch (DE); Werner Seibert, Kammerforst (DE); Christoph Beuerle, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 601 days.

(21) Appl. No.: 17/985,351

(22) Filed: Nov. 11, 2022

(65) Prior Publication Data

US 2023/0151879 A1 May 18, 2023

(30) Foreign Application Priority Data

Nov. 17, 2021 (DE) ......................... 102021129961.6

(51) Int. Cl.
*B60T 13/74* (2006.01)
*B60T 1/06* (2006.01)
(Continued)

(52) U.S. Cl.
CPC ............ *B60T 13/746* (2013.01); *B60T 13/02* (2013.01); *F16D 65/18* (2013.01);
(Continued)

(58) Field of Classification Search
CPC ........ B60T 1/065; B60T 13/02; B60T 13/746; F16D 55/226; F16D 65/18;
(Continued)

(56) References Cited

U.S. PATENT DOCUMENTS 3,937,097 A * 2/1976 Fund .................. F16H 25/2228 74/424.86
2003/0051569 A1* 3/2003 Kapaan .................. F16D 65/18 74/424.82

(Continued)

FOREIGN PATENT DOCUMENTS

DE 10128252 A1 4/2002
DE 102016013356 A1 5/2018

(Continued)

OTHER PUBLICATIONS

English machined translation of JP-2021-116825A, Aug. 10, 2021.*

(Continued)

*Primary Examiner* — Robert A. Siconolfi
*Assistant Examiner* — San M Aung
(74) *Attorney, Agent, or Firm* — Kristin L. Murphy

(57) ABSTRACT

A ball-screw drive for an actuator assembly of a vehicle brake is disclosed, comprising a rotatably mounted recirculating ball screw on which a screw nut which is closed on one side is mounted, at least one thread being formed on the circumferential surface of the recirculating ball screw, in which thread a plurality of balls are guided in such a way that a rotation of the recirculating ball screw brings about an axial displacement of the screw nut along an axis of rotation of the recirculating ball screw. A ball return system is integrated in the recirculating ball screw. Furthermore, an actuator assembly comprising a ball-screw drive and a method for producing a ball-screw drive are indicated.

13 Claims, 5 Drawing Sheets

(51) Int. Cl.

| | |
|---|---|
| ***B60T 13/02*** | (2006.01) |
| ***F16D 55/226*** | (2006.01) |
| ***F16D 65/18*** | (2006.01) |
| ***F16D 121/24*** | (2012.01) |
| ***F16D 125/40*** | (2012.01) |
| ***F16D 127/06*** | (2012.01) |
| ***F16H 25/22*** | (2006.01) |

(52) U.S. Cl.
CPC .......... *F16H 25/2223* (2013.01); *B60T 1/065* (2013.01); *F16D 55/226* (2013.01); *F16D 2121/24* (2013.01); *F16D 2125/40* (2013.01); *F16D 2127/06* (2013.01)

(58) Field of Classification Search
CPC ............. F16D 2121/24; F16D 2125/40; F16D 2127/06; F16H 25/2223; F16H 25/2228; F16H 2025/081; F16H 2025/2087
USPC .......................................................... 188/156
See application file for complete search history.

(56) References Cited

U.S. PATENT DOCUMENTS

2005/0268737 A1 † 12/2005 Inoue
2009/0283371 A1 * 11/2009 Winkler ............. F16H 25/2233 74/216.3
2012/0018262 A1 * 1/2012 Winkler .................. F16D 65/18 188/106 F
2014/0069751 A1 * 3/2014 Park ........................ F16D 65/18 188/72.4
2016/0033018 A1 * 2/2016 Tashiro ................... F16D 65/18 74/424.81
2017/0023080 A1 * 1/2017 Gerber .................. F16D 55/224
2018/0149221 A1 * 5/2018 Lee ......................... F16D 65/66
2018/0163803 A1 * 6/2018 Lee ......................... F16D 65/18

FOREIGN PATENT DOCUMENTS

| | | | | |
|---|---|---|---|---|
| EP | 1637772 | A1 | | 3/2006 |
| EP | 2207982 | B1 | | 3/2011 |
| GB | 526735 | A | | 9/1940 |
| JP | 2021116825 | A | † | 8/2021 |

OTHER PUBLICATIONS

Erläuterungen zu Abschnitt C. Ergebnis der Ermittlung des Standes der Technik.
Isel, Eichenzell: Montage-und Wartungsanleitung Kugelgewindemuttern. 1999, https://www.isel.com/de/mwdownloads/download/link/id/3753/ [abgerufen am Jun. 12, 2023] [onoine].

* cited by examiner
† cited by third party 10
12
67
16,18
24
68,74
22
66
82
108
110
118
116
120
112
114
96
17
98
102
72
56
16,20
54
86
52
15
88
19
60
62
64
104
106
84
70
90
83

88
22
64
14
84
46
56
68
52
44
48
50
28
67
54
24
42
58
26
36
40
38
34

10
12
67
64
22
24
68,74
108
82
66
110
72
118
116
114
112
120
144
96
98
17
102
15
56
16,20
54
86
52
60
62
64
104
106
90
84
70
83
142
88
136
19

72
88
B
A
86
110

Fig. 7
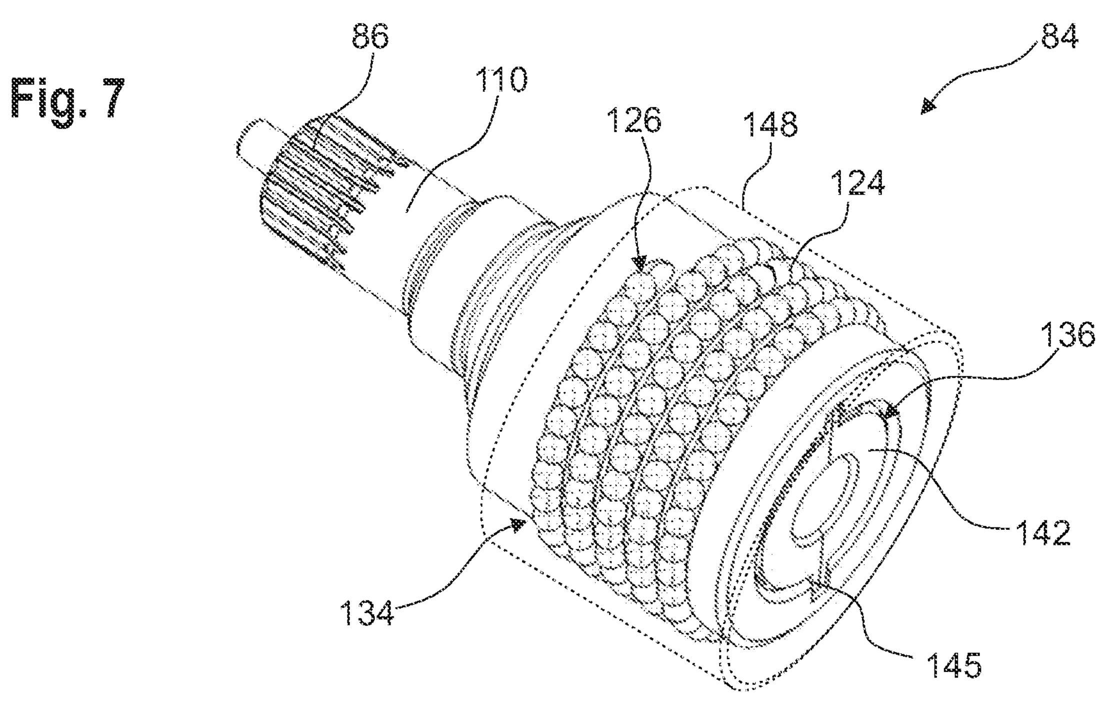
Fig. 8
Fig. 9
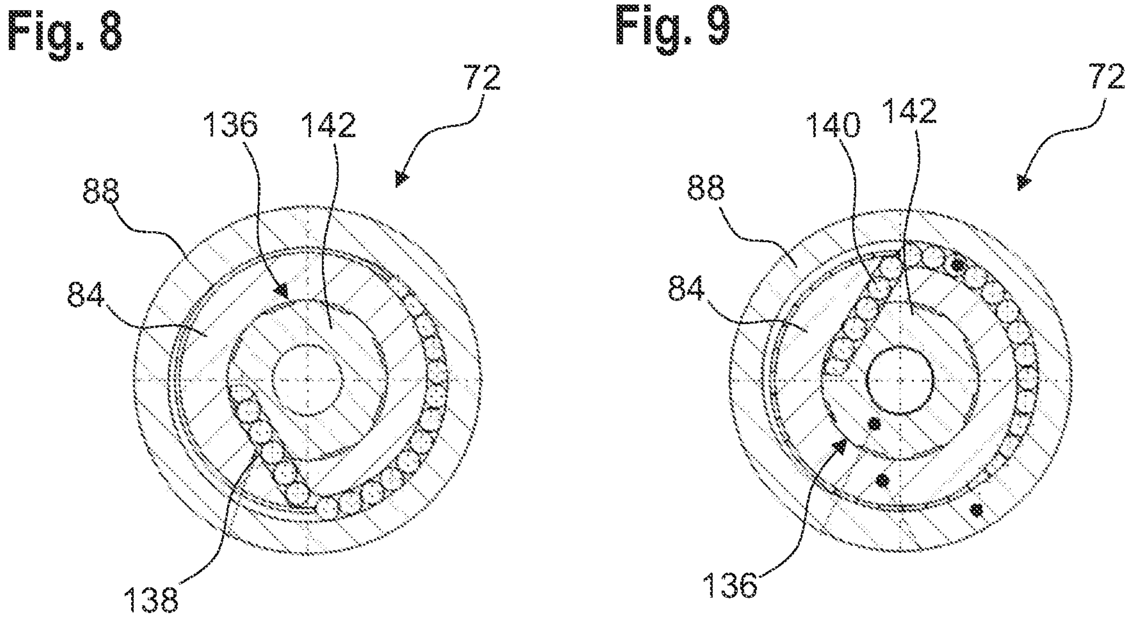

BALL-SCREW DRIVE FOR AN ACTUATOR ASSEMBLY, AN ACTUATOR ASSEMBLY, AND A METHOD FOR PRODUCING A BALL-SCREW DRIVE

CROSS-REFERENCE TO RELATED APPLICATION

This application claims priority to German Priority Application No. 10202112991.6, filed Nov. 17, 2021, the disclosure of which is Incorporated herein by reference in its entirety.

TECHNICAL FIELD

The disclosure relates to a ball-screw drive for an actuator assembly of a vehicle brake, for an electromechanically operated brake. The ball-screw drive has a recirculating ball screw, on which a screw nut which is closed on one side is mounted. The disclosure further relates to an actuator assembly comprising a ball-screw drive and to a method for producing a ball-screw drive.

BACKGROUND

In the case of conventional ball-screw drives for electromechanical brakes, the screw nut is open on both sides, and the ball return systems are located in the screw nut. By inserting a cylindrical rod in the screw nut in a stepwise manner, the balls can be mounted in the threads and ball return systems thereof. The balls are secured against falling out by the cylindrical rod in the screw nut. The screw is then screwed into one end of the screw nut, and the cylindrical rod is thereby pushed out of the other end of the nut.

There is a need to provide a ball-screw drive with a screw nut which is closed on one side, A closed screw nut can be used as a brake piston for placing a brake pad on a brake rotor without requiring additional intermediate elements.

However, in the case of a ball-screw drive having a screw nut which is closed on one side, assembly in the conventional manner is not possible, since the rod which is used as an assembly aid cannot be pushed out by inserting the screw in the screw nut. It is also not possible to pre-assemble the balls on the screw in conventional ball-screw drives, since in this case, the ball return system which is located in the screw nut cannot be filled with balls.

SUMMARY

What is needed is a ball-screw drive which makes it possible to use a screw nut which is closed on one side. What is also needed is a method for assembling a ball-screw drive with a screw nut which is closed on one side.

A ball-screw drive for an actuator assembly of a vehicle brake is disclosed. The ball-screw drive comprises a rotatably mounted recirculating ball screw on which a screw nut which is closed on one side is mounted. On a circumferential surface of the recirculating ball screw, at least one thread is formed, in which a plurality of balls are guided in such a way that a rotation of the recirculating ball screw brings about an axial displacement of the screw nut along an axis of rotation of the recirculating ball screw. According to the disclosure, a ball return system is integrated in the recirculating ball screw.

As a result of integrating the ball return system into the recirculating ball screw, it is possible to use a screw nut which is closed on one side. To be more precise, in a pre-assembly step, both the threads of the recirculating ball screw and the ball return system integrated in the recirculating ball screw can be completely filled with balls. The screw nut can then be pushed onto the recirculating ball screw.

Another advantage of the ball-screw drive according to the disclosure is that, as a result of the ball return system integrated in the recirculating ball screw, the ball-screw drive can have an axially shorter design than known ball-screw drives, with the same stroke. The reason for this is the possibility that an axial bearing, on which the ball-screw drive is supported on a side facing away from the closed end of the screw nut, can protrude part way into the screw nut when the screw nut is retracted without releasing the cover over the balls.

The screw nut is for example piston-shaped and can be produced in either one or two parts. When produced in two parts, the screw nut can be formed from a sleeve having an end-face cover which is welded to the sleeve.

In one exemplary arrangement, the screw nut has on an inner face thereof, a continuous thread which corresponds to the thread of the recirculating ball screw.

According to one exemplary arrangement, on the circumferential surface of the recirculating ball screw, a continuous thread having a plurality of windings is formed, the recirculating ball screw, on an end face which is directed towards the closed side of the screw nut, having a recess which axially extends completely across the thread of the recirculating ball screw, in each case a channel, proceeding from a start and an end of the thread, running to the recess so that the start and the end of the thread are interconnected by the recess.

This means that a ball return system is formed by the recess. When a start or an end of the thread is arrived at during a rotation of the recirculating ball screw, the ball is pushed from the downstream balls into the channel when the recirculating ball screw is rotated further and transported through the recess and the other channel to the opposite end of the thread. Whether the balls pass through the recess from the start of the thread to the end or vice versa depends on the direction of rotation of the recirculating ball screw.

Taking into account manufacturing tolerances, the diameter of the channels corresponds to the diameter of the balls.

In one exemplary arrangement, each channel runs tangentially to a circumferential wall of the recess. In this way, the balls can roll into the recess without much resistance.

Furthermore, each channel continuously adjoins the start or the end of the thread.

In one exemplary arrangement, a guide part is securely inserted in the recess, wherein on an outer face of the guide part, a guide for the balls is formed, and the guide interconnects the two channels which open into the recess. The balls are guided in the recess by a guide in a defined manner from one channel to the other and are thereby transported from the end of the thread through the channels and the recess back to a start of the thread or vice versa. Rattling noises may be prevented during rotation of the recirculating ball screw by the guide.

The guide part is arranged in the recess without play for example in a defined angular and axial position.

In one exemplary arrangement, the guide part is pressed into the recess. Because the guide part is arranged in a defined angular and axial position, particularly precise guiding of the balls is possible, for example at the transitions from the channels to the guide part. More precisely, the defined position of the guide part prevents a protruding edge that could block the movement of the balls from occurring at a transition from the channel to the guide part.

According to one exemplary arrangement, the guide has an arcuate deflector adjoining each channel, which deflector joins each channel tangentially. The arcuate deflector also ensures the lowest possible resistance to the balls when they roll through the guide.

According to another exemplary arrangement, the at least one thread has a thread winding which does not extend fully around the circumference, the start and the end of the thread winding being interconnected by a ball return system which is formed on the circumferential surface of the recirculating ball screw. The ball return system permits the balls to circulate continuously in the thread.

The thread which does not extend fully around the circumference extends over less than 360°.

The ball return system can be recessed in relation to the thread, in such a way that the balls roll under thread ridges of the screw nut when passing through the ball return system. In this way, the balls can circulate continuously in the thread.

According to one exemplary arrangement, at least two, for example four separate threads are formed on the circumferential surface of the recirculating ball screw which are each closed by a ball return system, the ball return systems being arranged offset from one another in the circumferential direction. As a result of the offset, the threads can be arranged particularly close together axially, by which a compact construction of the recirculating ball screw is achieved. Because there are a plurality of threads, better force transmission is achieved.

The problem is further solved according to the disclosure by an actuator assembly for a vehicle brake comprising a ball-screw drive according to the disclosure, wherein the screw nut forms a brake piston. That is to say that the screw nut is used to place a brake pad on a brake rotor.

The problem is further solved according to the disclosure by a method for producing a ball-screw drive according to the disclosure, comprising the following steps:

- a recirculating ball screw and a screw nut closed on one side are provided,
- an assembly sleeve is pushed in a stepwise manner by the recirculating ball screw, and in the meantime, the balls are inserted in the at least one thread of the recirculating ball screw and in the ball return system, wherein as a result of the stepwise pushing of the assembly sleeve, the balls which are already inserted are secured against falling out, and
- the recirculating ball screw is then introduced into the open end of the screw nut in a screwing movement, the screw nut contacting the assembly sleeve and pushing on the screw nut in such a way that the balls roll out of the assembly sleeve into the screw nut. The assembly sleeve, which is not part of the subsequent ball-screw drive.

In the method according to the disclosure, the balls are not firstly pre-assembled in the screw nut, as is conventional, but rather on the recirculating ball screw. As a result, it is possible to use a screw nut which is closed on one side.

BRIEF DESCRIPTION OF DRAWINGS

Further advantages and features of the disclosure can be found in the following description and from the accompanying drawings to which reference is made. In the drawings:

FIG. 7 shows the ball-screw drive from FIG. 6 without a screw nut, FIG. 8 shows a cross section through the ball-screw drive along a line A-A in FIG. 6, FIG. 9 shows a cross section through the ball-screw drive along a line B-B in FIG. 6.

DETAILED DESCRIPTION

Figure 1:
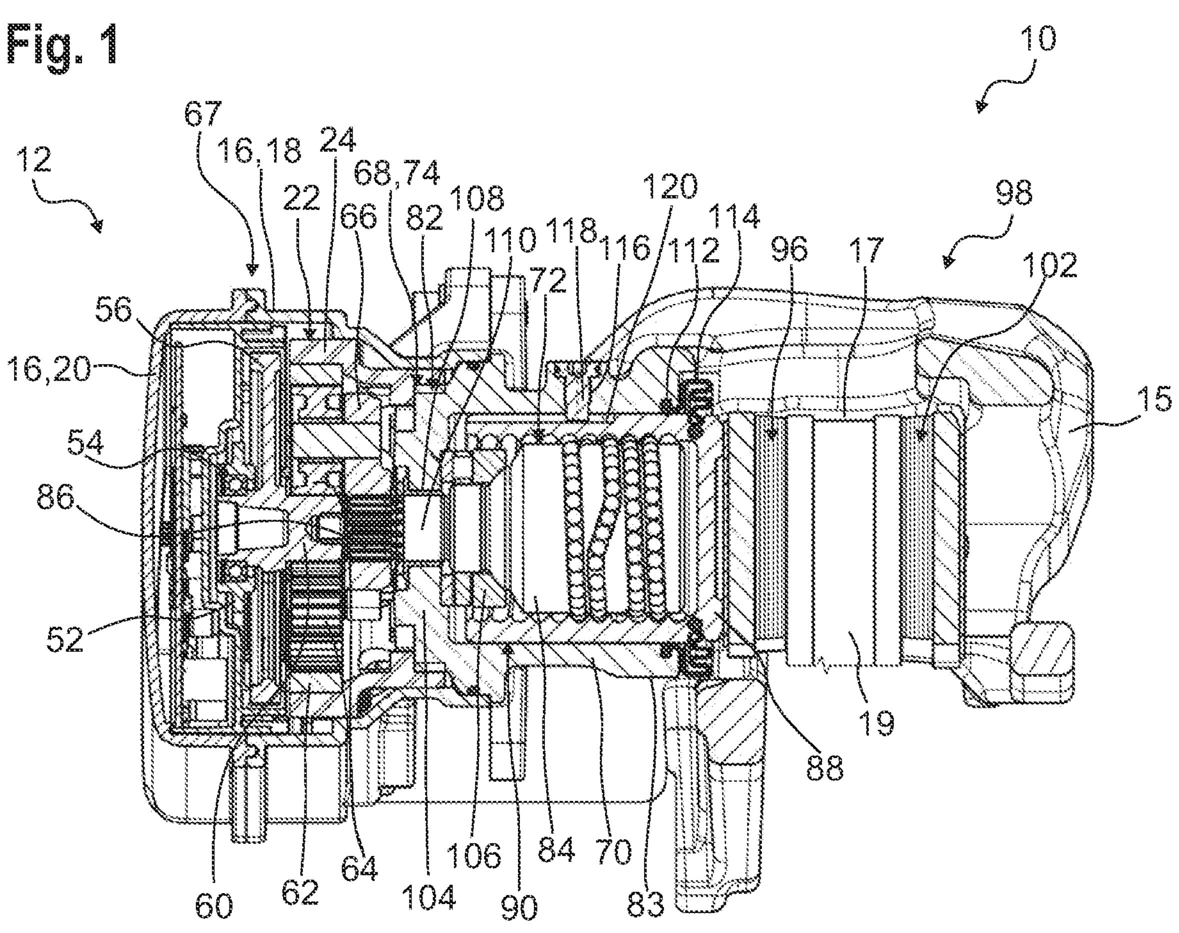
FIG. 1 is a sectional view of an actuator assembly according to the disclosure, comprising a ball screw drive according to the disclosure, according to a first exemplary arrangement.

FIG. 1 shows an actuator assembly 10 for a vehicle brake.

Figure 2:
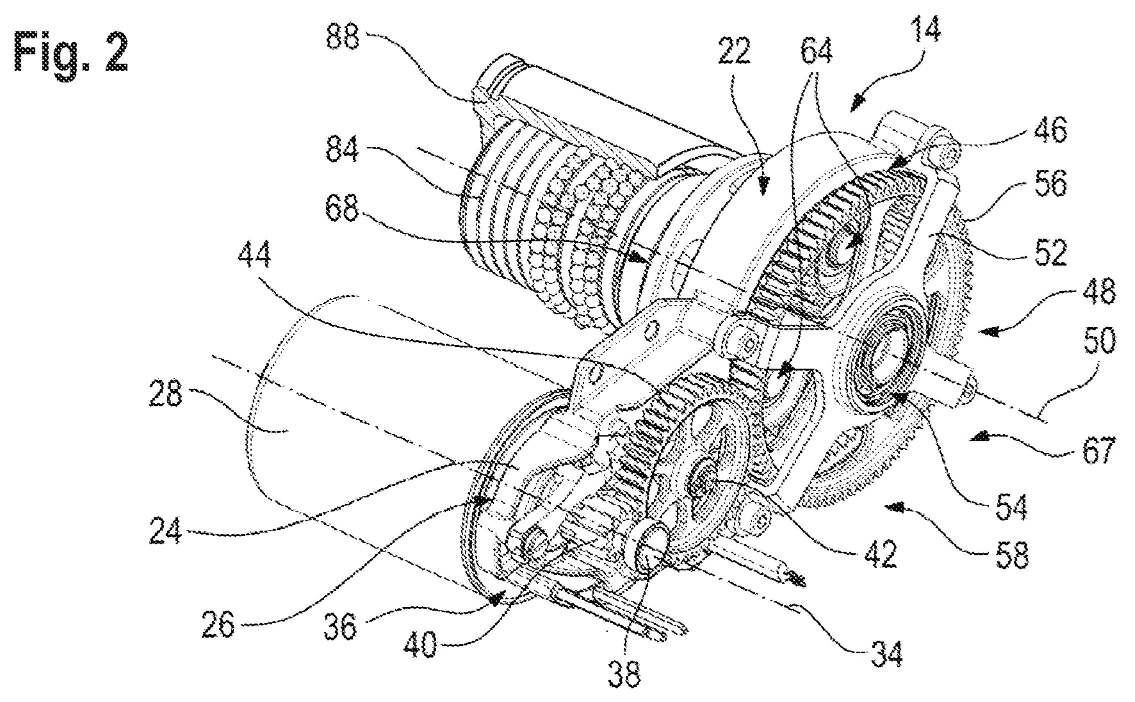
FIG. 2 shows a drive assembly of the actuator assembly from FIG. 1.

The actuator assembly 10 comprises a control assembly 12 which can be assembled as a separate subunit and a drive assembly 14 which can be assembled as a separate subunit (see FIG. 2).

The control assembly 12 and the drive assembly 14 are arranged in a common housing 16.

The housing 16 comprises a substantially sleeve-shaped housing part 18 and a housing cover 20, by which the housing base part 18 is sealingly closed when assembled.

In the exemplary arrangement shown, the housing cover 20 is also substantially shell-shaped.

Both the housing base part 18 and the housing cover 20 are produced from plastics material. The housing 16 is thus made of plastics material overall.

Furthermore, the actuator assembly 10 comprises a brake calliper 15 in which a gap 17 for a brake rotor 19, that is to say a brake disc, is formed. The end of the housing 16 which is close to the brake rotor 19 is pushed in part onto the brake calliper 15.

The drive assembly 14 comprises a carrier assembly 22 which has a planar frame part 24, as can be seen in FIG. 2.

On the planar frame part 24, a first mounting interface 26 is provided, on which an electric motor 28 is mounted in the exemplary arrangement shown.

More precisely, the electric motor 28 is connected to the frame part 24 in a captive manner by the first mounting interface 26. The frame part 24 absorbs the forces of the electric motor 28 and holds this motor.

The electric motor 28 is mounted on the frame part 24 so as to be centred in particular with respect to a central axis 34 of the first mounting interface 26.

In addition, an anti-rotation arrangement 36 in the form of an anti-rotation recess is provided, which is designed to prevent the electric motor 28 from rotating relative to the frame part 24.

In order to introduce torque into the drive assembly 14, an output gearwheel 40 is arranged on an output shaft 38 of the electric motor 28.

Furthermore, a bearing pin 42 is provided on the frame part 24, on which pin a gearwheel 44 which engages with the output gearwheel 40 is mounted in the exemplary arrangement shown.

In addition, a receiving cavity 46 for a planetary gear stage 48 is provided on the frame part 24.

In this case, a central axis 50 of the receiving cavity 46 is arranged substantially parallel to the central axis 34 of the first mounting interface 26.

Furthermore, a reinforcing part 52 is mounted on the frame part 24 in such a way that it axially spans the end of the receiving cavity 46 with respect to the central axis 50.

In the exemplary arrangement shown, the reinforcing part 52 is substantially cross-shaped.

A bearing point 54 for a gearwheel 56 arranged coaxially with the planetary gear stage 48 is additionally provided on the reinforcing part 52.

The gearwheel 56 engages with the gearwheel 44.

Consequently, a gear train 58 is formed by the gearwheel 44 and the gearwheel 56, the output gearwheel 40 acting as the input member thereof.

Furthermore, the gearwheel 56 is formed integrally with a sun gear 60 (see FIG. 1) of the planetary gear stage 48. In this way, the gear train 58 and the planetary gear stage 48 are drivingly coupled.

The planetary gear stage 48 also comprises a ring gear 62 which extends substantially along an inner circumference of the receiving cavity 46.

In the exemplary arrangement shown, a total of three planet gears 64 are provided in a driving manner between the sun gear 60 and the ring gear 62. These planet gears are rotatably mounted on a planet carrier 66.

In this case, the planet carrier 66 is an output element of the planetary gear stage 48.

The gear train 58 and the planetary gear stage 48 together are also referred to as a gear unit 67.

The frame part 24 further comprises a second mounting interface 68 which is designed for mounting the brake calliper 15 received therein.

In this case, a central axis of the second mounting interface 68 coincides with the central axis 50 of the receiving cavity 46 and for this reason is provided with the same reference sign. The mounting interface 68 is formed for example by a splined shaft geometry.

In this way, an anti-rotation arrangement 80 of the second mounting interface 68 is formed.

At the end of the brake calliper 15 which is to be coupled to the second mounting interface 68, a complementary anti-rotation geometry 82 is provided, for example, a correspondingly splined shaft geometry.

As a result, the brake calliper 15 can be inserted along the central axis 50 into the anti-rotation geometry 74 of the second mounting interface 68 and is held there in an interlocking, rotationally fixed manner.

As shown in FIG. 1, the brake calliper 15 comprises, in addition to the gap 17 for the brake rotor 19, a sleeve-shaped portion 70.

The anti-rotation geometry 82 is formed on an outer wall 83 of the brake calliper 15 in the region of the sleeve-shaped portion 70.

The sleeve-shaped portion 70 is open towards the gap 17.

A ball-screw drive 72 is received inside the sleeve-shaped portion 70.

This drive comprises a recirculating ball screw 84.

In this case, the recirculating ball screw 84 is connected, by a toothed portion 86, to the planet carrier 66 for conjoint rotation (see FIG. 1).

The ball-screw drive 72 can thus be driven by the electric motor 28. In the detail, the electric motor 28 is coupled in a driving manner to the ball-screw drive 72 by the gear train 58 and the planetary gear stage 48.

On the recirculating ball screw 84, a screw nut 88 which is axially closed on one side is mounted, this screw nut being in particular in the form of a piston-shaped brake piston. The screw nut 88 is accordingly likewise received in the sleeve-shaped portion 70.

In this case, a rotation of the recirculating ball screw 84 brings about an axial displacement of the screw nut 88 along the central axis 50.

In this case, the screw nut 88 is guided directly on a running surface 90 along the central axis 50, the running surface 90 being formed by an inner face of the sleeve-shaped portion 70. The running surface 90 substantially corresponds to a cylindrical lateral face forming the inner circumference of the sleeve-shaped portion 70.

The screw nut 88 is used to place a first brake pad 96 of a brake calliper assembly 98 on the brake rotor 19. That is to say that the first brake pad 96 can be actively moved towards a brake rotor 19 by the actuator assembly 10.

In the detail, the screw nut 88 is selectively transferred, by the electric motor 28 via the gear train 58, the planetary gear stage 48 and the ball-screw drive 72, into an extended position which is associated with placing the first brake pad 96 on the brake rotor 19.

As a result of the reaction forces acting inside the actuator assembly 10 and the brake calliper assembly 98, a second brake pad 102 is thereby also placed on the brake rotor 19.

It is understood that, by operating the electric motor 28, the screw nut 88 can likewise be moved into a retracted position which is associated with lifting the first brake pad 96 and the second brake pad 102 off the brake rotor 19.

In the present case, the actuator assembly 10 is designed to be free from self-locking so that the screw nut 88 also automatically moves back into the retracted position as a result of system-inherent elasticities when it is no longer actively urged into the extended position by the electric motor 28.

In order to absorb the resulting counterforces during actuation of the brake calliper assembly 98, the sleeve-shaped portion 70, on an end pointing away from the gap 17, has a wall 104 which runs transversely to a direction of movement of the screw nut 88, which in this case is a radially inwardly pointing flange.

The ball-screw drive 72 is axially supported on the wall 104, a bearing 106.

In the wall 104, there is a recess 108 through which a shaft 110 of the ball-screw drive 72 extends.

The toothed portion 86 is formed on the shaft 110.

The shaft 110 is coupled to the gear unit 67 outside the sleeve-shaped portion 70.

At the transition from the gap 17 to the sleeve-shaped portion 70, there is a recess 112 for a seal 114 on an inner face of the brake calliper 15.

The seal 114 has a bellows-like design and is also held on the screw nut 88 in addition to the brake calliper 15 so that the seal 114 is pulled apart or squeezed together during a displacement of the screw nut 88.

Furthermore, there is a recess 116 in the brake calliper 15 in the region of the sleeve-shaped portion 70. In the recess 116, an anti-rotation element 118 is inserted which protrudes through the recess 116 and engages in an axially extending groove 120 on the screw nut 88.

In the exemplary arrangement, the anti-rotation element 118 is a screw which is screwed into a threaded hole that forms the recess 116.

In the following, in connection with FIGS. 1, 3 and 4, a ball-screw drive 72 according to a first exemplary arrangement according to the disclosure will be described.

On the circumferential surface of the recirculating ball screw 84, in the exemplary arrangement, four threads 122 are formed (see FIG. 3) in each of which a plurality of balls 124 are guided in such a way that a rotation of the recirculating ball screw 84 brings about an axial displacement of the screw nut 88 along the central axis 50 which coincides with the axis of rotation of the ball of the recirculating ball screw 84. The number of threads 122 can vary.

The four threads 122 are formed separately from one another.

Each thread 122 has a thread winding 126 which does not extend fully around the circumference, the start 128 and the end 130 of the thread winding 126 being interconnected by a ball return system 132.

The ball return system 132 is formed on the circumferential surface of the recirculating ball screw 84.

Figure 4:
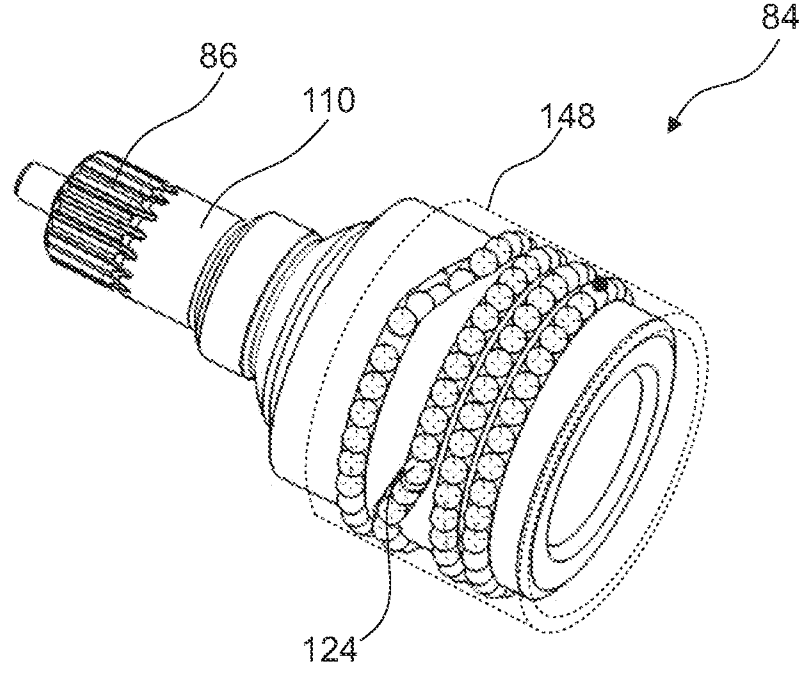
FIG. 4 shows the recirculating ball screw from FIG. 3 with balls inserted.

In FIG. 4, it can be seen that the ball return system is recessed in relation to the thread 122. As a result, the balls 124 can roll under thread ridges of the screw nut 88 when passing through the ball return system 132. Therefore, the balls 124 can roll from the start 128 of a thread 122 to the end 130 or vice versa depending on the direction of rotation of the recirculating ball screw 84.

Figure 3:
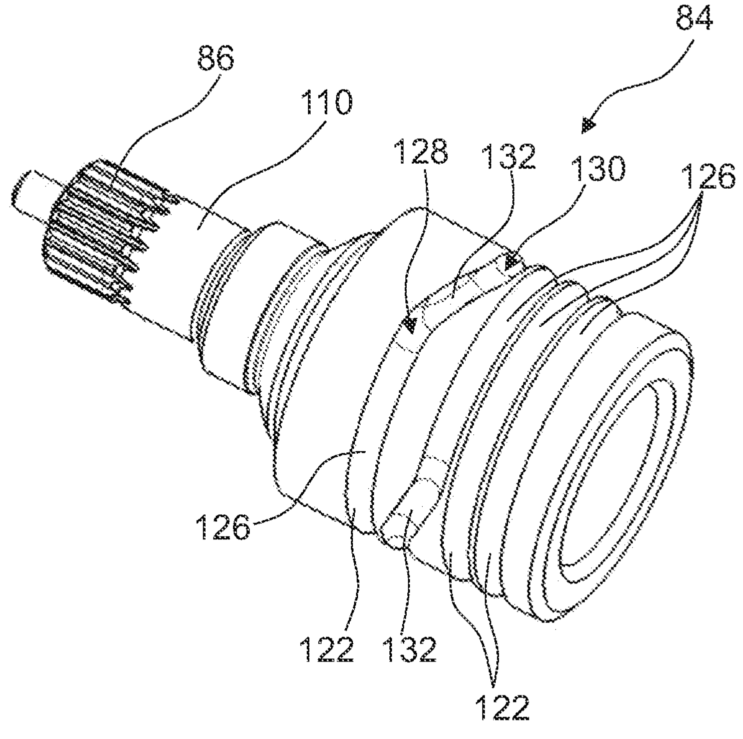
FIG. 3 shows a recirculating ball screw of the actuator assembly according to the disclosure shown in FIG. 1.

When a plurality of separate threads 122 are formed on the circumferential surface of the recirculating ball screw 84 which are each closed by a ball return system 132, the ball return systems 132 are arranged offset from one another in the circumferential direction, as can be seen in FIGS. 3 and 4 for at least two of the four threads 122.

In this case, the ends of the ball return system 132 tangentially adjoin the angle of inclination of the thread winding 126 with a constant curvature. The raceway radius of the thread winding 126 and the raceway radius of the ball return system 132 is the same in the connection region in each case. A resistance acting on the balls 124 is thereby kept to a minimum.

Figures 5, 6:
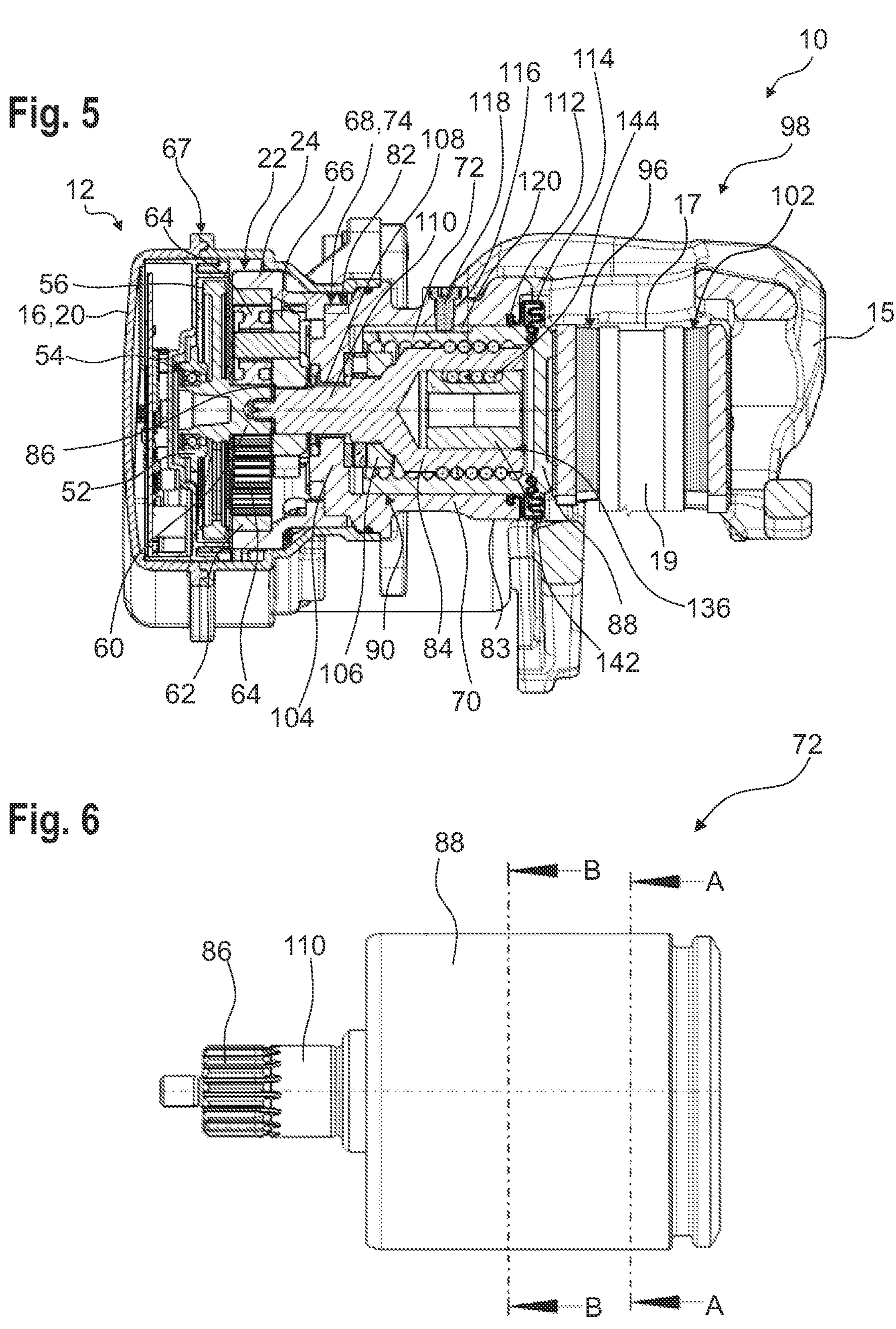
FIG. 5 is a sectional view of an actuator assembly according to the disclosure, comprising a ball-screw drive according to the disclosure, according to another exemplary arrangement.
FIG. 6 shows the ball-screw drive according to the disclosure of the actuator assembly from FIG. 5.

FIG. 5 shows an actuator assembly 10 according to another exemplary arrangement.

For like structures having like functions which are known from the exemplary arrangement above, the same reference signs are used in the following, and in this respect, reference is made to the preceding explanations, wherein in the following, the differences between the respective exemplary arrangements are described in detail to avoid repetition.

The two exemplary arrangements share the ac that the ball return system 2 is integrated in the recirculating ball screw 84.

In the exemplary arrangements shown in FIGS. 5 to 11, however, this is solved in a different manner than in the exemplary arrangement according to FIGS. 1 to 4.

As can be seen from FIG. 7, which shows the recirculating ball screw 84 with inserted balls 124, a continuous thread 134 having a plurality of windings is formed on the circumferential surface of the recirculating ball screw 84.

On an end face which is directed towards the closed side of the screw nut 88, the recirculating ball screw 84 has a central recess 136 (see also FIG. 5).

The recess 136 axially extends completely across the thread 134 of the recirculating ball screw 84.

Proceeding from a start 128 and an end 130 of the thread 134, one channel 138, 140 in each case runs to the recess 136. The channels 138, 140 are visible in FIGS. 8 and 9, which each show a cross section through the ball-screw drive 72 at the start 128 and at the end 130 of the thread 134.

The start 128 and the end 130 of the thread 134 are thus interconnected by the recess 136 and the channels 138, 140.

FIGS. 8 and 9 also show that the channels 138, 140 extend tangentially to a circumferential wall of the recess 136.

To ensure guidance of the balls 124, a guide part 142 is inserted in the recess 136.

Figure 10:
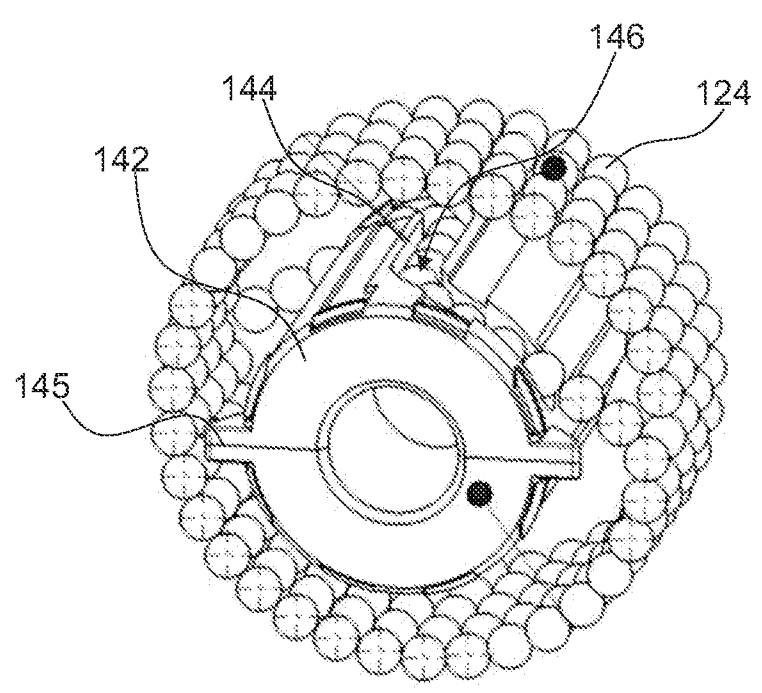
FIG. 10 shows a guide part of the ball-screw drive according to the disclosure according to FIGS. 5 to 9 with balls.
Figure 11:
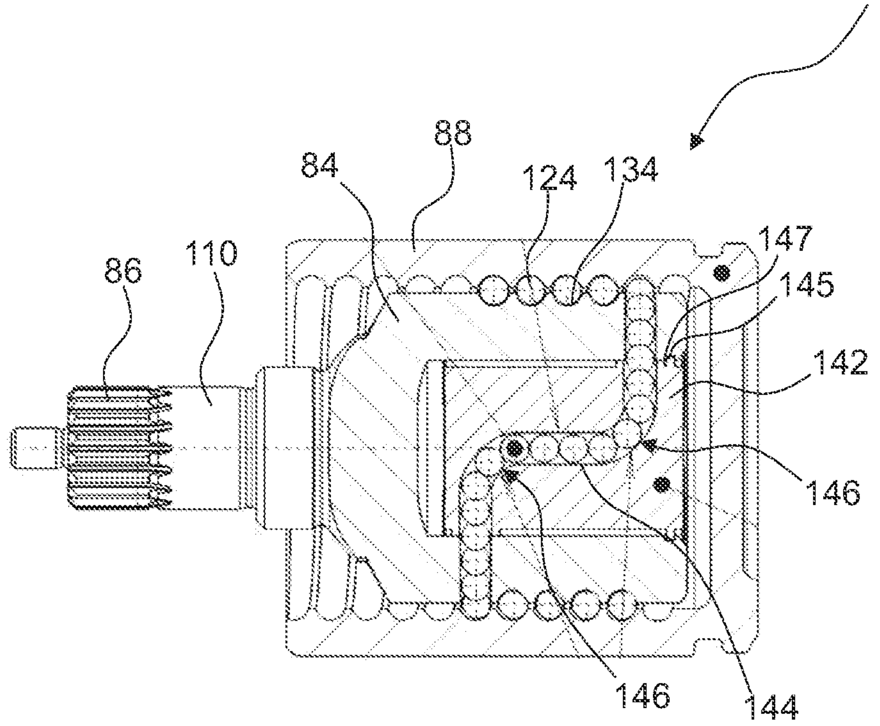
FIG. 11 is a longitudinal sectional view through the ball-screw drive according to the disclosure according to FIGS. 5 to 9.

As can be seen in FIGS. 10 and 11, a guide 144 for the balls 124 is formed on an outer face of the guide part 142.

The guide 144 is completely covered by an inner wall of the recess 136.

The guide 144 interconnects the two channels 138, 140 which open into the recess 136.

The guide part 142 is arranged in the recess 136 without play in a defined angular and axial position. For this purpose, there is an arrangement for orientation and axial fixing on both the guide part 142 and the recirculating ball screw. In one exemplary arrangement, this arrangement is formed for example by protrusions 145 on the guide part 142 which can engage in a corresponding recess 147 in the recirculating ball screw 84 (see FIG. 11).

The defined angular and axial position is selected in such a way that the channels 138, 140 align with the guide 144.

For example, the guide 144 has an arcuate deflector 146 adjoining each channel 138, 140, which deflector joins each channel 138, 140 tangentially.

The method for producing the ball-screw drive 72 takes place in the same manner for the two exemplary arrangements described.

Firstly, a recirculating ball screw 84 and a screw nut 88 closed on one side are provided.

Then, by the recirculating ball screw 84, an assembly sleeve 148 is pushed in a stepwise manner, which is illustrated by a dashed line in FIGS. 4 and 7, and in the meantime, the balls 124 are inserted in the at least one thread 122, 134 of the recirculating ball screw 84 and in the ball return system 132, wherein as a result of the stepwise pushing of the assembly sleeve 148, the balls 124 which are already inserted are secured against falling out.

The recirculating ball screw 84 is then introduced into the open end of the screw nut 88 in a screwing movement, the screw nut 88 contacting the assembly sleeve 148 and pushing on the screw nut 88 in such a way that the balls 124 roll out of the assembly sleeve 148 into the screw nut 88.

The invention claimed is:

1. A ball-screw drive for an actuator assembly of a vehicle brake, comprising:

a rotatably mounted recirculating ball screw on which a screw nut which is closed on one side is mounted, wherein, on a circumferential surface of the recirculating ball screw, at least one thread is formed, in which a plurality of balls are guided in such a way that a rotation of the recirculating ball screw brings about an axial displacement of the screw nut along an axis of rotation of the recirculating ball screw, wherein a ball return system is integrated in the recirculating ball screw, the ball return system comprising:

a recess formed on an end face of the recirculating ball screw which is directed towards the closed side of the screw nut;

at least one continuous thread having a plurality of windings formed on the circumferential surface of the recirculating ball screw, with a start and an end of the thread; and a channel proceeding from each of the start and the end of the thread and running to the recess, each channel extending tangentially to a circumferential wall of the recess, and running at least part-way around the circumference of the recess before merging into the recess, so that the start and the end of the thread are interconnected by the recess via the channels.

2. A ball-screw drive according to claim 1, wherein on the circumferential surface of the recirculating ball screw, a continuous thread having a plurality of windings is formed, the recirculating ball screw, on an end face which is directed towards the closed side of the screw nut, having a recess which axially extends completely across the thread of the recirculating ball screw, in each case a channel, proceeding from a start and an end of the thread, running to the recess so that the start and the end of the thread are interconnected by the recess, each channel extending tangentially to a circumferential wall of the recess and running at least part-way around the circumference of the recess before merging into the recess.

3. A ball-screw drive according to claim 2, wherein each channel extends along a path that is tangential to the circumferential wall of the recess and follows a circumferential arc of at least 30 degrees before merging into the recess, thereby avoiding a radial, right-angle approach.

4. A ball-screw drive according to claim 2 wherein a guide part is securely inserted in the recess, wherein a guide for the balls is formed on an outer face of the guide part, and the guide interconnects the two channels which open into the recess.

5. A ball-screw drive according to claim 4, wherein the guide part is arranged in the recess without play in a defined angular and axial position.

6. A ball-screw drive according to either claim 4 wherein the guide has an arcuate deflector adjoining each channel, which deflector joins each channel tangentially.

7. A ball-screw drive according to claim 1, wherein the at least one thread has a thread winding which does not extend fully around the circumference, a start and an end of the thread winding being interconnected by a ball return system which is formed on a circumferential surface of the recirculating ball screw.

8. A ball-screw drive according to claim 7, wherein the ball return system is recessed in relation to the thread, in such a way that the balls roll under thread ridges of the screw nut when passing through the ball return system.

9. A ball-screw drive according to claim 7 wherein at least two separate threads are formed on the circumferential surface of the recirculating ball screw, which threads are each closed by a ball return system, the ball return systems being arranged offset from one another in the circumferential direction.

10. An actuator assembly for a vehicle brake, comprising a ball-screw drive according to claim 1, wherein the screw nut forms a brake piston.

11. A ball-screw drive according to claim 3 wherein a guide part is securely inserted in the recess, wherein a guide for the balls is formed on an outer face of the guide part, and the guide interconnects the two channels which open into the recess.

12. A ball-screw drive according to claim 5 wherein the guide has an arcuate deflector adjoining each channel, which deflector joins each channel tangentially.

13. A ball-screw drive according to claim 8 wherein at least two separate threads are formed on the circumferential surface of the recirculating ball screw, which threads are each closed by a ball return system, the ball return systems being arranged offset from one another in the circumferential direction.

* * * * *